United States Patent [19]

Thomas et al.

[11] 3,976,822

[45] Aug. 24, 1976

[54] MAGNETIC TAPE AND PROCESS OF MAKING A MAGNETIC TAPE

[75] Inventors: Mary R. Thomas; Robert H. Lalk; Syamalarao Evani; Donald L. Schmidt, all of Midland, Mich.

[73] Assignee: The Dow Chemical Company, Midland, Mich.

[22] Filed: May 23, 1975

[21] Appl. No.: 580,500

Related U.S. Application Data

[62] Division of Ser. No. 479,958, June 17, 1974, Pat. No. 3,901,816.

[52] U.S. Cl. ............................... 428/500; 427/48; 427/128; 427/130; 427/131; 428/539; 428/900
[51] Int. Cl.² .......................................... H01F 10/02
[58] Field of Search ............... 427/48, 127–132; 200/332.3; 428/900, 500, 539; 252/62.54

[56] References Cited
UNITED STATES PATENTS

| | | |
|---|---|---|
| 3,437,510 | /0000 | Diaz .................................. 427/130 |
| 3,505,109 | /0000 | Schnell et al. ...................... 252/62 |
| 3,636,052 | /0000 | Hatch et al. ..................... 260/332.3 |
| 3,660,431 | /0000 | Hatch et al. ..................... 260/332.3 |
| 3,749,737 | /0000 | Hatch et al. ..................... 260/332.3 |
| 3,804,797 | /0000 | Broxterman et al. ............... 260/29.6 |
| 3,813,363 | /0000 | Schmidt et al. ..................... 260/29.3 |

*Primary Examiner*—Bernard D. Pianalto
*Attorney, Agent, or Firm*—C. E. Rehberg; David H. Fifield

[57] ABSTRACT

Magnetic tapes are made by applying to a backing film an aqueous dispersion of magnetic particles having dissolved therein cyclic sulfonium zwitterion monomers, magnetically orienting the magnetic particles, drying the coating and curing same. Upon removal of the water and/or moderate heating, the monomers polymerize to form a durable matrix having the magnetic particles dispersed therein.

7 Claims, No Drawings

MAGNETIC TAPE AND PROCESS OF MAKING A MAGNETIC TAPE

CROSS-REFERENCE TO RELATED APPLICATION

This is a division, of application Ser. No. 479,958, filed June 17, 1974 now U.S. Pat. No. 3,901,816.

BACKGROUND OF THE INVENTION

Magnetic recording tapes are widely used in recording sound and electrical signals, as in video recorders, computers and data processing and recording machines and the like. Such tapes typically consist of a thin plastic backing tape coated with a solid plastic matrix in which is embedded finely powdered particles of a magnetizable material. See, for example Schnell, et al., U.S. Pat. No. 3,505,109 and Diaz, U.S. Pat. No. 3,437,510.

A great deal of work has been done in the magnetic tape art to improve the uniformity and density of the magnetic coating. This has largely been directed to using smaller and more uniform magnetic particles and to improving the density and uniformity of their distribution in the plastic matrix or binder layer. Another highly desirable objective has been to devise a coating composition that can be applied from an aqueous medium, thus avoiding the problems that arise from the use of organic solvents, such as high cost, toxicity to workers, pollution of the environment, etc.

Hatch, et al., U.S. Pat. Nos. 3,636,052, 3,660,431 and 3,749,737, 3,749,738 and 3,749,739 describe cyclic sulfonium zwitterionic compounds that readily polymerize to produce solid plastics that are useful as coating materials.

Schmidt, et al., U.S. Pat. No. 3,813,363, describe the use of the Hatch, et al. compounds as coating materials into which various particulate solids, such as silica, silicone oils, iron oxide, alumina, magnesium oxide, barium sulfate, calcium carbonate, titanium dioxide, synthetic rubber and polytetrafluoroethylene, are incorporated and coatings are made therefrom.

Broxterman, et. al., U.S. Pat. No. 3,804,797 disclose compositions comprising the above Hatch, et al., compounds and a water-soluble anionic polymer containing a plurality of carboxyl groups (which latter may be in ammonical salt form). Such compositions are useful as coating materials since they may be prepared in aqueous or organic solvent medium, applied to a substrate, dried to a solid film, and then, if desired, cured to a water-resistant and solvent-resistant coating by a brief, mild heat treatment.

SUMMARY OF THE INVENTION

It has now been discovered that improved magnetic tapes can be made by using as binders for the magnetic coating the cyclic sulfonium zwitterion (CSZ) compounds described in the above Hatch, et al. and Schmidt, et al. patents.

Since one of the technical problems in making magnetic tapes is in achieving a coating material that contains a high density of very finely divided and uniformly dispersed magnetic particles, the efficacy of the dispersing agent is of great practical importance. The ammonium salts of polymeric polycarboxylic acids, such as polyacrylic acid, polymethacrylic acid and copolymers of acrylic and methacrylic acids with each other and/or maleic anhydride are particularly effective. They also have the advantageous property of reacting with the CSZ during the curing step, thus losing their surfactant properties and becoming an integral part of the polymer. The acrylic polymers and copolymers are most effective as dispersing agents when of a molecular weight of about 2000-5000. Also preferred are the similar styrene-maleic anhydride copolymers. Other known dispersants for pigments in aqueous systems can be used provided they do not interact adversely with the CSZ compounds. Broxterman, et. al., U.S. Pat. No. 3,804,797 diclose a variety of suitable such dispersants.

A particular feature of the present invention is that the basic film or backing to which the magnetic coating is to be applied is preferably first primed with a very thin film of CSZ which is then polymerized (cured) in place. By this means the adhesion of the magnetic coating is greatly improved. While the primer coat can be applied from an aqueous solution of the CSZ monomer, even better results are obtained by use of an organic solvent. Other primers, such as polyurethanes, copolymers of ethylene and acrylic acid, may also be used.

DETAILED DESCRIPTION OF THE INVENTION

In practicing the invention, an aqueous dispersion of the magnetic particles containing the dissolved CSZ monomer is applied to the backing, the particles are magnetically oriented, the coated film is dried and the polymerization of the CSZ monomer is completed by a mild heat treatment. The drying and curing may be effected in a single heat treatment, as, for instance, by passing the wet film under a bank of infrared lamps or through a tunnel oven. The temperature attained in the heat treatment is not critical and may be varied widely. The drying may be effected at from room temperature to about 150°C., about 80° – 120°C. being optimum. While the polymerization proceeds to a large extent concurrently with the drying, it is usually preferred to assure completion by a further heat treatment which can be at the same or a higher temperature, up to that at which the backing film might begin to soften or deform. For most systems 1–5 minutes at 75°–150°C. is suitable.

While the magnetic particles may be any of those known in the art such as chromium dioxide, zinc ferrous ferrite, etc., iron oxide particles are the most widely used. They should be finely divided, uniformly dispersed in the coating medium, inert to the dispersing agent, binder and backing, and magnetically oriented. Also, their density per unit area on the tape should be as high as possible while the thickness of the coating should be as small as possible consistent with acceptable functional properties. To maximize these opposing desiderata the coating composition should contain the maximum possible proportion of magnetic particles and the minimum proportion of binder that is consonant with the need for sufficient fluidity for application of a uniform layer on the backing and the production of a finished coating that has the requisite smoothness, toughness, flexibility, adherence to the backing and abrasion resistance. This means that the volume ratio of pigment (magnetic particles) to binder (CSZ polymer) should be as high as possible without undue sacrifice of film properties. The CSZ binders of this invention are notable in that they usually function satisfactorily at levels close to the critical pigment volume concentration.

The binder materials that are preferred are those consisting essentially of about 50–80% by weight of monofunctional CSZ compounds, the remainder being polyfunctional CSZ compounds. The latter serve as crosslinkers in the polymerization and yield polymers having superior strength, toughness and solvent resistance. The optimum ratio of the two types is usually about 60:40.

The monofunctional CSZ compounds disclosed in Hatch, et. al. U.S. Pat. No. 3,636,052 and the polyfunctional ones disclosed by the same patentees in U.S. Pat. Nos. 3,660,431 and 3,749,737, 3,749,738 and 3,749,739, all of which are hereby incorporated by reference, are suitable for use in the present invention. In all of them the functional group is of the formula

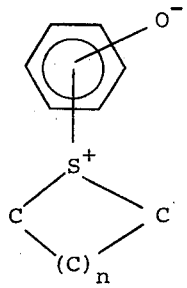

wherein $n$ is 2–3 and the carbon atom valences are satisfied with H, alkyl or other inert substituents and, in the case of the polyfunctional compounds, two or more such moieties are linked together through bridging groups, such as alkylene, O, S, or other linking group attached to the aromatic rings. The production of coatings by use of CSZ monomers is more fully described by Schmidt, et al. in U.S. Pat. No. 3,813,363, and Broxterman, et. al., in U.S. Pat. No. 3,804,797, the disclosures of which are hereby incorporated by reference.

The desired viscosity of the coating formulation will vary somewhat, depending on the apparatus and technique used in applying the coating. The viscosity can be controlled by adjusting the proportion of water in the formulation and by the type and amount of dispersing agent used.

In practicing the invention, the magnetic particles are dispersed in water with a suitable dispersing agent until thoroughly dispersed. The CSZ compounds are then added in the form of an aqueous solution of concentration such as will provide the desired viscosity in the finished formulation. The mixture may then be mixed for a brief period to assure thorough blending and is then ready for use.

The base to be coated is preferably primed by application of a dilute solution of a CSZ monomer, suitably the same as will be used as the pigment binder, dried, cured, and then coated by any conventional technique with the above formulation, dried and cured as described above.

The primer coat should preferably be very thin. A thickness of about 0.1 to 0.3 micron is usually satisfactory. Such a coat is conveniently obtained by application of a solution of about 1–3% CSZ monomers in butanol or other inert solvent and then drying the resulting film.

The coating formulation can be applied to the primed base by any conventional techniques, such as by use of a rod coater or a doctor blade. The coated base film is the passed near a magnet to orient the particles, after which the coating is dried and cured as described above.

SPECIFIC EMBODIMENTS OF THE INVENTION

A 3-inch tape of polyethylene terephthalate sold under the tradename "Mylar" was primed by application with a No. 14 Meyer rod of a 2% solution in n-butanol of a CSZ mixture consisting of the following:

a. 70% by weight of the compound of the formula

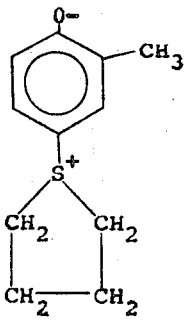

This compound was prepared as described in U.S. Pat. No. 3,636,052, Example 4–2.

b. 30% by weight of the compound of the formula

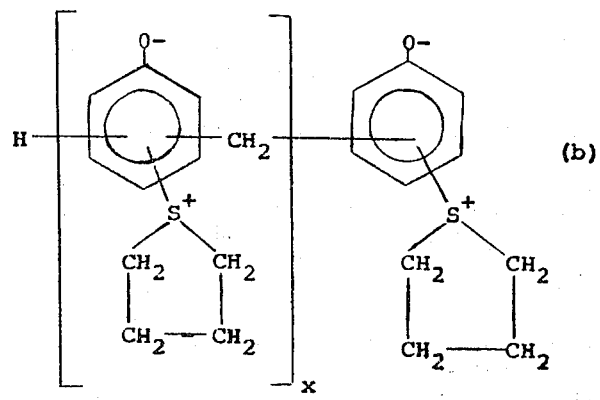

wherein $x$ had a value of about 1.1. This CSZ was prepared as described in U.S. Pat. No. 3,749,738, Example 1.

After being dried and cured at 88°C. the primer coating was found to be 0.15 microns thick.

The primed tape was then coated with a magnetic coating as follows:

Gamma iron oxide (Pfizer No. 2230), 349 g., was placed in a stainless steel ball mill with 7 g. of the ammonium salt of polyacrylic acid (mol. wt. about 2000–5000) and 213 g. of water and milled for 20 hr. Then a solution of 75 g. of the monofunctional CSZ of the formula (a) shown above and 32 g. of the polyfunctional CSZ of the formula (b), above, in 102 g. of water was added and milling was continued for 30 min. The resulting dispersion was applied to the tape with a doctor blade at the rate of 30–40 ft. per min. The coating was oriented by a solenoid magnet, passed through a 40-foot oven at 110°C., and then slit to ¼ inch width.

The finished tape showed a smooth, durable surface and excellent response in magnetic recording.

What is claimed is:

1. The process of making a magnetic tape comprising coating a base tape with an aqueous dispersion of magnetic particles having dissolved therein monomer cyclic sulfonium zwitterions comprising one or more functional group represented by the formula

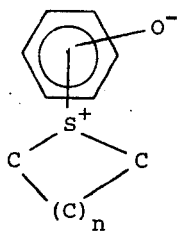

wherein $n$ is 2–3 and the carbon atom valences are satisfied with H, alkyl or other inert substituents and, in the case of polyfunctional zwitterions, two or more functional groups are linked together through bridging groups attached to the aromatic rings, the monomeric cyclic sulfonium zwitterions being present in an amount sufficient, when polymerized, to constitute a binder for the magnetic particles and together with the particles, to constitute a firmly adherent, flexible magnetic coating for said tape, magnetically orienting the magnetic particles therein, drying the coated tape and curing the coated tape by heating at about 75°–150°C.

2. The process of claim 1 wherein the dispersion contains as an active dispersing agent the ammonium salt of a polymeric polycarboxylic acid.

3. The process of claim 2 wherein the acid is a polymer or copolymer of acrylic, methacrylic or maleic acid of molecular weight of about 2000–5000.

4. The process of claim 1 wherein the magnetic particles are iron oxide.

5. The process of claim 1 wherein about 50–80% by weight of the zwitterions are monofunctional, the remainder being polyfunctional.

6. The magnetic tape made by the process of claim 1.

7. The process of claim 1 wherein the base tape is primed before being coated, said priming consisting essentially of applying a dilute solution of cyclic sulfonium zwitterions to the tape and then drying and curing the primer by heating it at about 75°–150°C.

* * * * *

UNITED STATES PATENT AND TRADEMARK OFFICE
CERTIFICATE OF CORRECTION

PATENT NO. : 3,976,822

DATED : August 24, 1976

INVENTOR(S) : Mary R. Thomas; Robert H. Lalk; Syamalarao Evani; Donald L. Schmidt It is certified that error appears in the above-identified patent and that said Letters Patent are hereby corrected as shown below:

On the title page, under "References Cited" the references should read as follows:

-- 3,437,510    4-69    Diaz...
       3,505,109    4-70    Schnell et al. ...
       3,636,052    1-72    Hatch et al. ...
       3,660,431    5-72    Hatch et al. ...
       3,749,737    7-73    Hatch et al. ...
       3,804,797    4-74    Broxterman et al. ...
       3,813,363    5-74    Schmidt et al. ... --;

Column 1, line 45, "ammonical" should read --ammoniacal--;

Column 2, line 9, delete "al.";

Column 2, line 9, "diclose" should read --disclose--;

Column 2, line 12, "basic" should read --base--;

Column 3, line 40, "porportion" should read --proportion--;

Column 3, line 66, the first appearing "the" should read --then--.

Signed and Sealed this

Twenty-eighth Day of December 1976

[SEAL]

Attest:

RUTH C. MASON
*Attesting Officer*

C. MARSHALL DANN
*Commissioner of Patents and Trademarks*